United States Patent
Yerramalli et al.

(10) Patent No.: US 10,798,735 B2
(45) Date of Patent: Oct. 6, 2020

(54) ENHANCED LICENSED ASSISTED ACCESS UPLINK CHANNEL ACCESS

(71) Applicant: QUALCOMM Incorporated, San Diego, CA (US)

(72) Inventors: Srinivas Yerramalli, San Diego, CA (US); Tao Luo, San Diego, CA (US); Xiaoxia Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 15/336,509

(22) Filed: Oct. 27, 2016

(65) Prior Publication Data
US 2017/0135128 A1    May 11, 2017

Related U.S. Application Data

(60) Provisional application No. 62/252,278, filed on Nov. 6, 2015.

(51) Int. Cl.
*H04W 74/00* (2009.01)
*H04W 74/08* (2009.01)
(Continued)

(52) U.S. Cl.
CPC ......... *H04W 74/006* (2013.01); *H04W 72/14* (2013.01); *H04W 74/0808* (2013.01); *H04W 74/02* (2013.01)

(58) Field of Classification Search
CPC . H04W 72/14; H04W 16/14; H04W 72/1263; H04W 74/0816
See application file for complete search history.

(56) References Cited

U.S. PATENT DOCUMENTS

2017/0366308 A1* 12/2017 Choi ................. H04L 1/1887
2018/0115983 A1* 4/2018 Harada ............. H04W 72/1231
(Continued)

FOREIGN PATENT DOCUMENTS

EP              3352522 A1   7/2018
WO   WO-2013086659 A1   6/2013
(Continued)

OTHER PUBLICATIONS

U.S. Appl. No. 62/243560, filed Oct. 19, 2015, This is a provisional application of 2018/0270860 by Bhorkar et al.*
(Continued)

*Primary Examiner* — Mansour Oveissi
(74) *Attorney, Agent, or Firm* — Robert Reid

(57) ABSTRACT

Solutions to problems from delays in channel acquisition by UEs in a contention-based shared radio frequency spectrum band are disclosed. For example, if an eNB knows of a recent or ongoing downlink transmission on a frequency to be used for uplink transmission by a UE, then the eNB may instruct the UE to either skip performance of LBT on that frequency or else perform a type of LBT that is shorter in duration than a full CCA. One way for the eNB to instruct the UE in this fashion is to set an indicator in an uplink grant transmitted to the UE on another frequency. Additionally, in order to avoid truncation of an uplink transmission opportunity, an eNB may notify a UE that an uplink grant is valid for more than one starting point.

29 Claims, 10 Drawing Sheets

(51) Int. Cl.
*H04W 72/14* (2009.01)
*H04W 74/02* (2009.01)

(56) References Cited

U.S. PATENT DOCUMENTS

2018/0270860 A1* 9/2018 Bhorkar ............ H04W 72/0406
2019/0014596 A1* 1/2019 Yang ................ H04W 72/0446

FOREIGN PATENT DOCUMENTS

WO  WO-2017070055 A1  4/2017
WO  WO-2017074638 A1  5/2017

OTHER PUBLICATIONS

Catt., "UL LBT Framework for LAA", 3GPP Draft, R1-153922, 3rd Generation Partnership Project (3GPP), Mobile Competence Centre; 650, Route Des Lucioles, F-06921 Sophia-Antipolis Cedex, France, vol. RAN WG1, No. Beijing China; 20150824-20150828, Aug. 23, 2015, XP051001352, 3 pages. Retrieved from the Internet: URL:http://www.3gpp.org/ftp/Meetings_SGPP_ SYNC/RAN1/Docs/ [retrieved on Aug. 23, 2015] lines 11-13 of section 2.2; p. 1.

CMCC., "Discussion on Issues Related to UL Channel Access for LAA", 3GPP Draft, R1-155785, 3rd Generation Partnership Project (3GPP), Mobile Competence Centre, 650, Route Des Lucioles, F-06921 Sophia-Antipolis Cedex, France, vol. Ran WG1. No. Malmo. Sweden, 20151005-20151009, Sep. 26, 2015, XP051021757, Section 2.2, 4 pages. Retrieved from the Internet: URL:http://www.3gpp.org/ftp/tsg ran/WG1 RL1/TSGR1 82b/Docs/.

Ericsson., "On Forward Compatibility of DL-only LAA Design", 3GPP Draft; R1-156044, 3rd Generation Partnership Project (3GPP), Mobile Competence Centre; 650, Route Des Lucioles; F-06921 Sophia-Antipolis Cedex; France, vol. RAN WG1, No. Malmo, Sweden, 20151005-20151009, Oct. 4, 2015, XP051039807, 2 pages. Retrieved from the Internet: URL:http://www.3gpp.org/ftp/Meetings_3GPP_SYNC/RAN1/Docs/ [retrieved on Oct. 4, 2015] section 2; p. 1.

ETRI., "Discussion on the UL LBT for LAA", 3GPP Draft, R1-153001—Discussion on the UL LBT for LAA, 3rd Generation Partnership Project (3GPP), Mobile Competence Centre, 650, Route Des Lucioles, F-06921 Sophia-Antipolis Cedex, France, vol. RAN WG1, No. Fukuoka, Japan, 20150525-20150529, May 24, 2015, XP050973612, Section 2.1, 9 pages. Retrieved from the Internet: URL:http://www.3gpp.org/ftp/Meetings_3GPP_SYNC/RAN1/Docs/ [retrieved on May 24, 2015].

Huawei., et al., "UL LBT for LAA", 3GPP Draft, R1-155099, 3rd Generation Partnership Project (3GPP), Mobile Competence Centre, 650, Route Des Lucioles, F-06921 Sophia-Antipolis Cedex, France, vol. RAN WG1, No. Malmo, Sweden, 20151005-201510094, Oct. 4, 2015 (Oct. 4, 2015), XP051002087, Section 2, pp. 1-4. Retrieved from the Internet: URL:http://www.3gpp.org/ftp/Meetings 3GPP SYNC/RAN1/Docs/.

International Search Report and Written Opinion—PCT/US2016/059398—ISA/EPO—dated Jan. 24, 2017.

Zte., "UL Framework for LAA", 3GPP Draft, R1-155245 UL Framework for LAA, 3rd Generation Partnership Project (3GPP), Mobile Competence Centre, 650, Route Des Lucioles, F-06921, Sophia-Antipolis Cedex, France, vol. RAN WG1, No. Malmo, Sweden, 20151905-20151009, Oct. 4, 2015, XP051002210, pp. 1-6. Retrieved from the Internet: URL:http://www.3gpp.org/ftp/Meetings_3GPP_SYNC/RAN1/Docs/.

Catt: "Uplink Channel Access Scheme for Rel-14 eLAA," 3GPP Draft; R1-162284, 3rd Generation Partnership Project (3GPP), Mobile Competence Centre; 650, Route Des Lucioles, F-06921 Sophia-Antipolis Cedex; France, vol. RAN WG1, No. Busan, Korea; 20160411-20160415, Apr. 2, 2016, XP051080069, 4 Pages, Retrieved from the Internet: URL: http://www.3gpp.org/ftp/tsg_ran/WG1_RL1/TSGR1_84b/Docs/ [retrieved on Apr. 2, 2016].

Samsung: "Discussion on LBT for Self-carrier Scheduling," 3GPP Draft; R1-162284, 3rd Generation Partnership Project (3GPP), Mobile Competence Centre; 650, Route Des Lucioles; F-06921 Sophia-Antipolis Cedex; France, vol. RAN WG1, No. Busan, Korea; 20160411-20160415, Apr. 2, 2016, XP051080338, 5 pages, Retrieved from the Internet: URL: http://www.3gpp.org/ftp/tsg_ran/WG1_RL1/TSGR1_84b/Docs/ [retrieved on Apr. 2, 2016].

LG Electronics: "Remaining Details on UL LBT for LAA", 3GPP Draft; R1-166819 LBT, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; 20160822-20160826 Aug. 21, 2016, XP051125576, Retrieved from the Internet: URL:http://www.3gpp.org/ftp/Meetings_3GPP_SYNC/RAN1/Docs/ [retrieved on Aug. 21, 2016], 5 pages.

Samsung: "LBT for Cross-Carrier Scheduling", 3GPP Draft; R1-162670-Samsung-LBT-Cross-Carrier-Scheduling-Final, 3rd Generation Partnership Project (3GPP), Mobile Competence Centre; 650, Route Des Lucioles; F-06921 Sophia-Antipolis Cedex; France, vol. RAN WG1, No. Busan, Korea; 20160411-20160415 Apr. 2, 2016, XP051080337, Retrieved from the Internet: URL:http://www.3gpp.org/ftp/tsg_ran/WG1_RL1/TSGR1_84b/Docs/ [retrieved on Apr. 2, 2016], 3 pages.

* cited by examiner

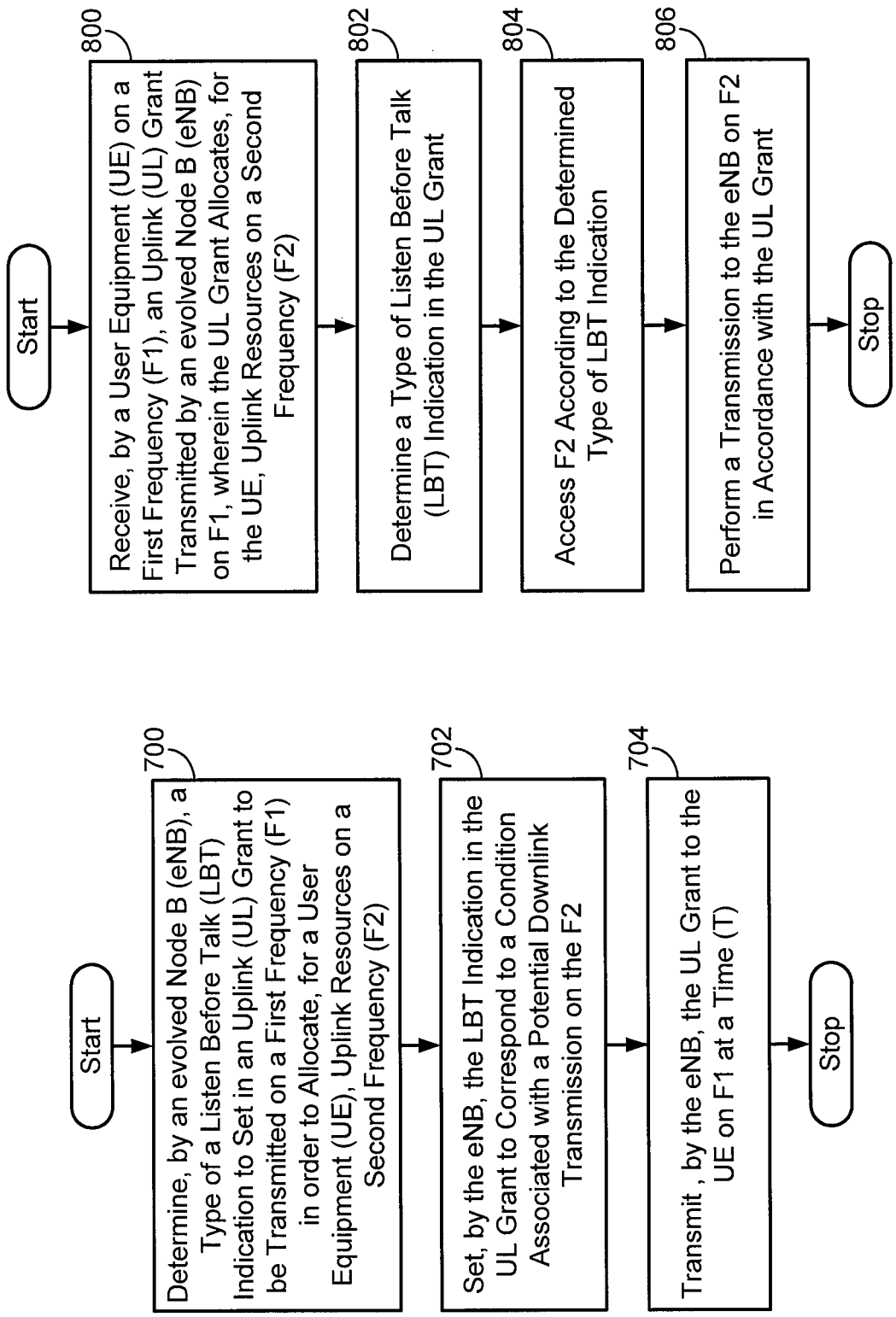

ENHANCED LICENSED ASSISTED ACCESS UPLINK CHANNEL ACCESS

CROSS-REFERENCE TO RELATED APPLICATIONS

The present application claims priority to U.S. Provisional Patent Application No. 62/252,278, entitled "ENHANCED LICENSED ASSISTED ACCESS UPLINK CHANNEL ACCESS," filed Nov. 6, 2015, the disclosure of which is hereby incorporated herein by reference in its entirety.

BACKGROUND

Field

Aspects of the present disclosure relate generally to wireless communication systems, and more particularly, to licensed assisted access (LAA) uplink channel access.

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

In accordance with various aspects disclosed herein, the present disclosure is directed to solving problems associated with delays in channel acquisition by UEs in a contention-based shared radio frequency spectrum band. For example, if an evolved Node B (eNB) has recently transmitted or is transmitting on a frequency to be used for uplink transmission by a UE, and/or if another base station or remote radio head in a CoMP set has done so, then the eNB may instruct the UE to either skip performance of LBT on that frequency or else perform a type of LBT that is shorter in duration than a full CCA. One way for the eNB to instruct the UE in this fashion is to set an indicator in an uplink grant transmitted to the UE on another frequency. Additionally, in order to avoid truncation of an uplink transmission opportunity (TXOP) due to failure of a UE to acquire a frequency in time to transmit at a starting point on that frequency, an eNB may notify the UE that an uplink grant is valid for more than one starting point.

In one aspect, a method of wireless communication includes determining, by an evolved Node B (eNB), a type of a Listen Before Talk (LBT) indication to set in an uplink (UL) grant to be transmitted on a first frequency (F1) in order to allocate, for a user equipment (UE), uplink resources on a second frequency (F2). The method additionally includes setting, by the eNB, the LBT indication in the UL grant to correspond to a condition associated with a potential downlink transmission on the F2, and transmitting, by the eNB, the UL grant to the UE at a time T.

In another aspect, a wireless communication apparatus has means for determining, by an evolved Node B (eNB), a type of a Listen Before Talk (LBT) indication to set in an uplink (UL) grant to be transmitted on a first frequency (F1) in order to allocate, for a user equipment (UE), uplink resources on a second frequency (F2). The apparatus also has means for setting, by the eNB, the LBT indication in the UL grant to correspond to a condition associated with a potential downlink transmission on the F2, and means for transmitting, by the eNB, the UL grant to the UE at a time T.

In another aspect, a wireless communication apparatus includes at least one computer processor configured to determine, by an evolved Node B (eNB), a type of a Listen Before Talk (LBT) indication to set in an uplink (UL) grant to be transmitted on a first frequency (F1) in order to allocate, for a user equipment (UE), uplink resources on a second frequency (F2). The processor is also configured to set, by the eNB, the LBT indication in the UL grant to correspond to a condition associated with a potential downlink transmission on the F2, and transmit, by the eNB, the UL grant to the UE at a time T. The apparatus further has at least one memory coupled to the at least one computer processor.

In another aspect, a computer program, stored on a non-transitory computer-readable medium, includes program code for causing at least one computer to determine, by an evolved Node B (eNB), a type of a Listen Before Talk (LBT) indication to set in an uplink (UL) grant to be transmitted on a first frequency (F1) in order to allocate, for a user equipment (UE), uplink resources on a second frequency (F2). The program code also causes the at least one computer to set, by the eNB, the LBT indication in the UL grant to correspond to a condition associated with a potential downlink transmission on the F2, and transmit, by the eNB, the UL grant to the UE at a time T.

In another aspect, a method of wireless communication includes receiving, by a user equipment (UE) on a first frequency (F1), an uplink (UL) grant transmitted by an evolved Node B (eNB), wherein the UL grant allocates, for the UE, uplink resources on a second frequency (F2). The method additionally includes determining a type of listen before talk (LBT) indication in the UL grant, accessing F2 according to the determined type of LBT indication, and performing UL transmission on F2 in accordance with the UL grant.

In another aspect, a wireless communication apparatus has means for receiving, by a user equipment (UE) on a first frequency (F1), an uplink (UL) grant transmitted by an evolved Node B (eNB), wherein the UL grant allocates, for the UE, uplink resources on a second frequency (F2). The apparatus also has means for determining a type of listen before talk (LBT) indication in the UL grant, means for accessing F2 according to the determined type of LBT indication, and means for performing UL transmission on F2 in accordance with the UL grant.

In another aspect, a wireless communication apparatus has at least one processor configured to receive, by a user equipment (UE) on a first frequency (F1), an uplink (UL) grant transmitted by an evolved Node B (eNB), wherein the UL grant allocates, for the UE, uplink resources on a second frequency (F2). The at least one processor is also configured to determine a type of listen before talk (LBT) indication in the UL grant, access F2 according to the determined type of LBT indication, and perform UL transmission on F2 in accordance with the UL grant. The apparatus further has at least one memory coupled to the at least one processor.

In another aspect, a computer program, stored on a non-transitory computer-readable medium, includes program code for causing at least one computer to receive, by a user equipment (UE) on a first frequency (F1), an uplink (UL) grant transmitted by an evolved Node B (eNB), wherein the UL grant allocates, for the UE, uplink resources on a second frequency (F2). The program code also causes the at least one computer to determine a type of listen before talk (LBT) indication in the UL grant, access F2 according to the determined type of LBT indication, and perform UL transmission on F2 in accordance with the UL grant.

In another aspect, a method of wireless communication includes indicating to a user equipment (UE), by an evolved Node B (eNB), that an uplink (UL) grant is valid for two or more start positions, including at least a first start position and a second start position. The method additionally includes transmitting, by the eNB, the UL grant to the UE, and attempting, by the eNB, to receive an UL transmission from the UE at the first start position. The method also comprises determining, by the eNB, that the attempt to receive the UL transmission at the first start position was not successful. The method further comprises, attempting, by the eNB and in response to determining that the attempt to receive the UL transmission at the first start position was not successful, to receive an UL transmission from the UE at the second start position.

In another aspect, a wireless communication apparatus has means for indicating to a user equipment (UE), by an evolved Node B (eNB), that an uplink (UL) grant is valid for two or more start positions, including at least a first start position and a second start position. The apparatus additionally has means for transmitting, by the eNB, the UL grant to the UE, and means for attempting, by the eNB, to receive an UL transmission from the UE at the first start position. The apparatus also has means for determining, by the eNB, that the attempt to receive the UL transmission at the first start position was not successful. The apparatus further has means for attempting, by the eNB and in response to determining that the attempt to receive the UL transmission at the first start position was not successful, to receive an UL transmission from the UE at the second start position.

In another aspect, a wireless communication apparatus has at least one processor configured to indicate to a user equipment (UE), by an evolved Node B (eNB), that an uplink (UL) grant is valid for two or more start positions, including at least a first start position and a second start position. The processor is additionally configured to transmit, by the eNB, the UL grant to the UE, and attempt, by the eNB, to receive an UL transmission from the UE at the first start position. The at least one processor is also configured to determine, by the eNB, that the attempt to receive the UL transmission at the first start position was not successful. The at least one processor is further configured to attempt, by the eNB and in response to determining that the attempt to receive the UL transmission at the first start position was not successful, to receive an UL transmission from the UE at the second start position. The apparatus further has at least one memory coupled to the at least one processor.

In another aspect, a computer program, stored on a non-transitory computer-readable medium, includes program code for causing at least one computer to indicate to a user equipment (UE), by an evolved Node B (eNB), that an uplink (UL) grant is valid for two or more start positions, including at least a first start position and a second start position. The program code additionally causes the at least one computer to transmit, by the eNB, the UL grant to the UE, and attempt, by the eNB, to receive an UL transmission from the UE at the first start position. The program code also causes the at least one computer to determine, by the eNB, that the attempt to receive the UL transmission at the first start position was not successful. The program code further causes the at least one computer to attempt, by the eNB and in response to determining that the attempt to receive the UL transmission at the first start position was not successful, to receive an UL transmission from the UE at the second start position.

In another aspect, a method of wireless communication includes receiving, by a user equipment (UE), an uplink (UL) grant from an evolved Node B (eNB), and receiving an indication from the eNB, by the UE, that the UL grant is valid for two or more start positions, including a first start position and a second start position. The method additionally includes attempting, by the UE, to acquire a channel in time to perform UL transmission using the first start position, and determining, by the UE, that the attempt to acquire the channel in time to perform UL transmission using the first start position was not successful. The method also includes attempting, by the UE and in response to determining that the attempt to acquire the channel in time to perform UL transmission using the first start position was not successful, to acquire the channel in time to perform UL transmission using the second start position.

In another aspect, a wireless communication apparatus has means for receiving, by a user equipment (UE), an uplink (UL) grant from an evolved Node B (eNB), and means for receiving an indication from the eNB, by the UE, that the UL grant is valid for two or more start positions, including a first start position and a second start position. The apparatus additionally has means for attempting, by the UE, to acquire a channel in time to perform UL transmission using the first start position, and means for determining, by the UE, that the attempt to acquire the channel in time to perform UL transmission using the first start position was not successful. The apparatus further has means for attempting, by the UE and in response to determining that the attempt to acquire the channel in time to perform UL transmission using the first start position was not successful, to acquire the channel in time to perform UL transmission using the second start position.

In another aspect, a wireless communication apparatus has at least one processor configured to receive, by a user equipment (UE), an uplink (UL) grant from an evolved Node B (eNB), and receive an indication from the eNB, by the UE, that the UL grant is valid for two or more start positions, including a first start position and a second start position. The at least one processor is additionally configured to attempt, by the UE, to acquire a channel in time to perform UL transmission using the first start position, and determine, by the UE, that the attempt to acquire the channel in time to perform UL transmission using the first start position was not successful. The at least one processor is also configured to attempt, by the UE and in response to determining that the attempt to acquire the channel in time to perform UL transmission using the first start position was not successful, to acquire the channel in time to perform UL transmission using the second start position.

In another aspect, a computer program, stored on a non-transitory computer-readable medium, includes program code for causing at least one computer to receive, by a user equipment (UE), an uplink (UL) grant from an evolved Node B (eNB), and receive an indication from the eNB, by the UE, that the UL grant is valid for two or more start positions, including a first start position and a second start position. The program code additionally causes the at least one computer to attempt, by the UE, to acquire a channel in time to perform UL transmission using the first start position, and determine, by the UE, that the attempt to acquire the channel in time to perform UL transmission using the first start position was not successful. The program code also causes the at least one computer to attempt, by the UE and in response to determining that the attempt to acquire the channel in time to perform UL transmission using the first start position was not successful, to acquire the channel in time to perform UL transmission using the second start position.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a block diagram illustrating example blocks executed to implement aspects of the disclosure.

FIG. 8 is a block diagram illustrating example blocks executed to implement aspects of the disclosure.

DETAILED DESCRIPTION

Figure 1:
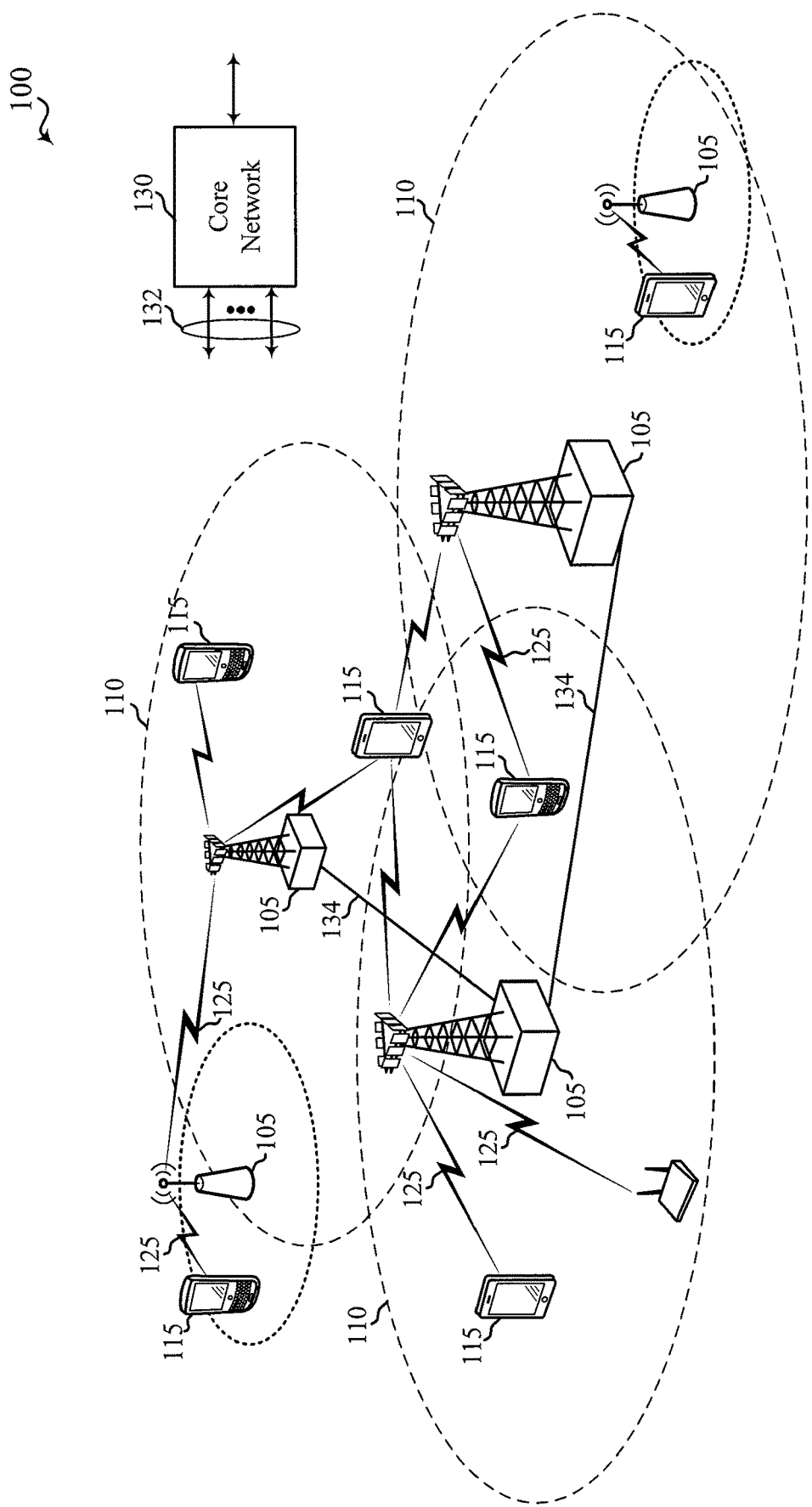
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
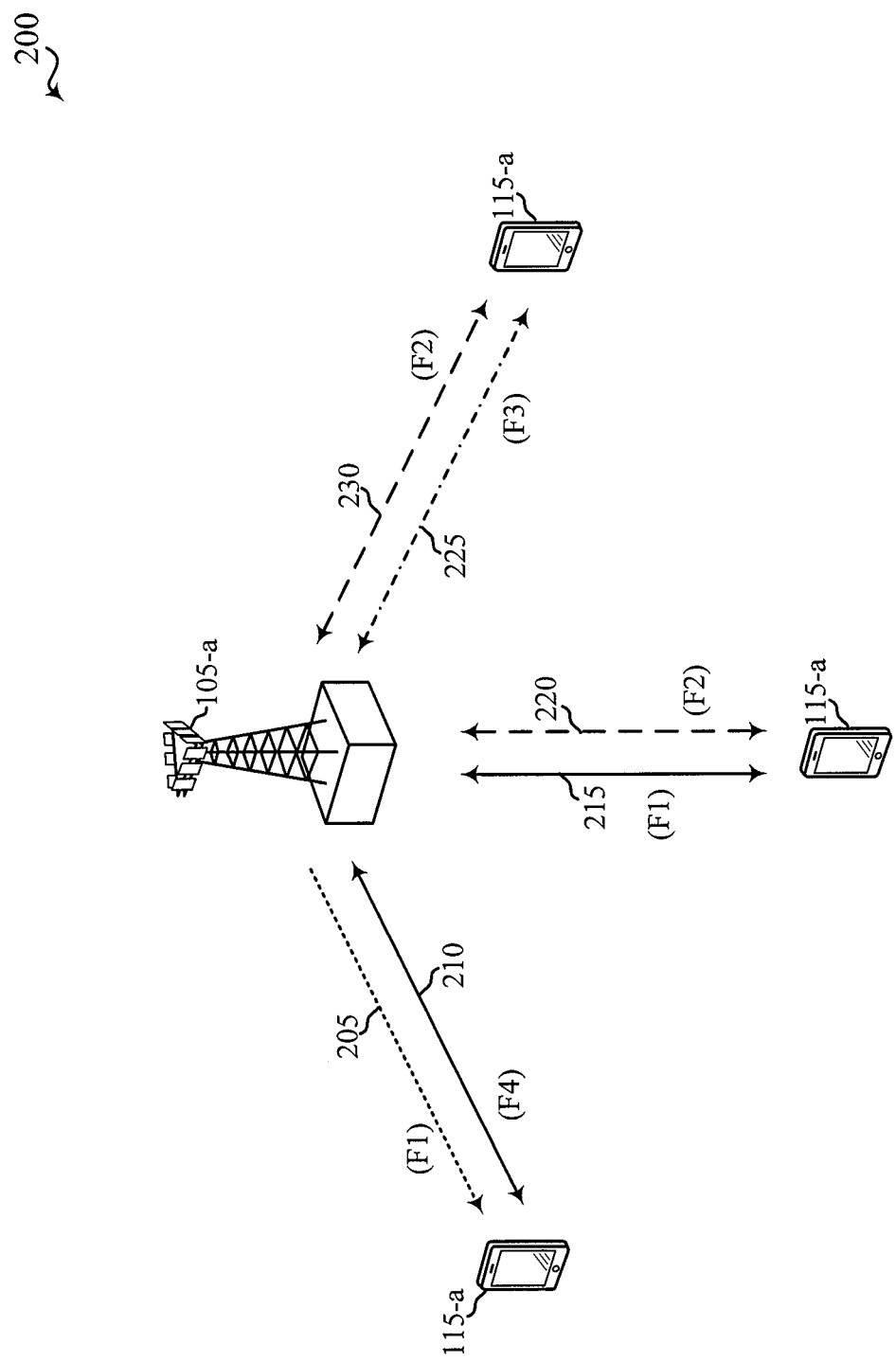
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode (e.g., LAA mode) in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
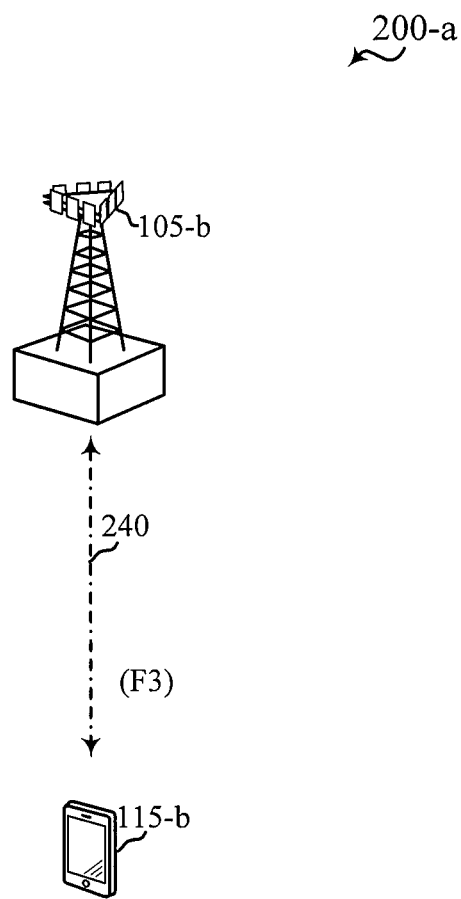
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A extended to contention-based shared spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105 or 105-*a* described with reference to FIG. 1, 2A, or 2B, or one of the UEs 115, 115-*a*, or 115-*b* described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
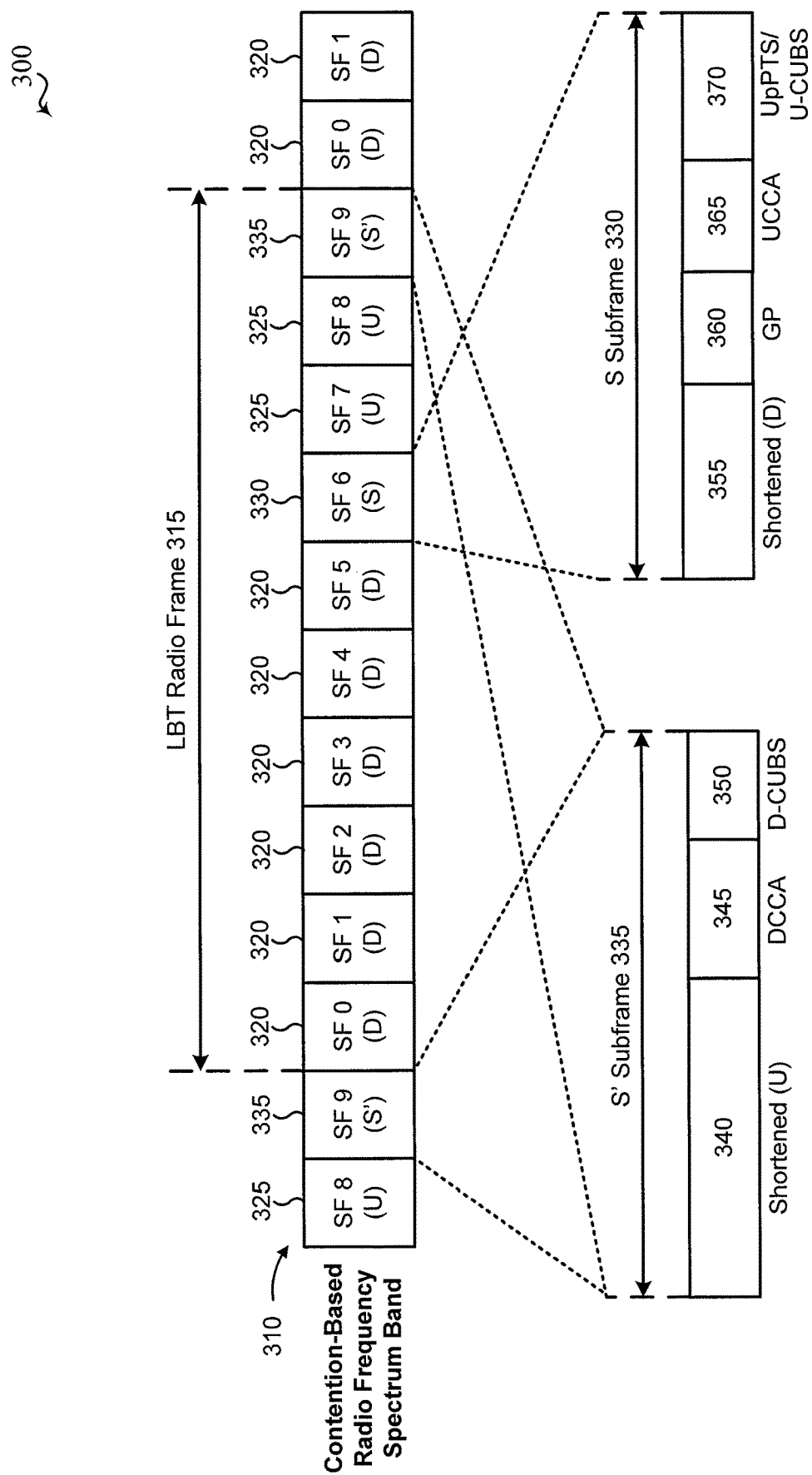
FIG. 3 is an illustration of an example of a wireless communication over an unlicensed radio frequency spectrum band, in accordance with various aspects of the present disclosure.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, 205, or 205-*a* described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-*a*, 215-*b*, or 215-*c* described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
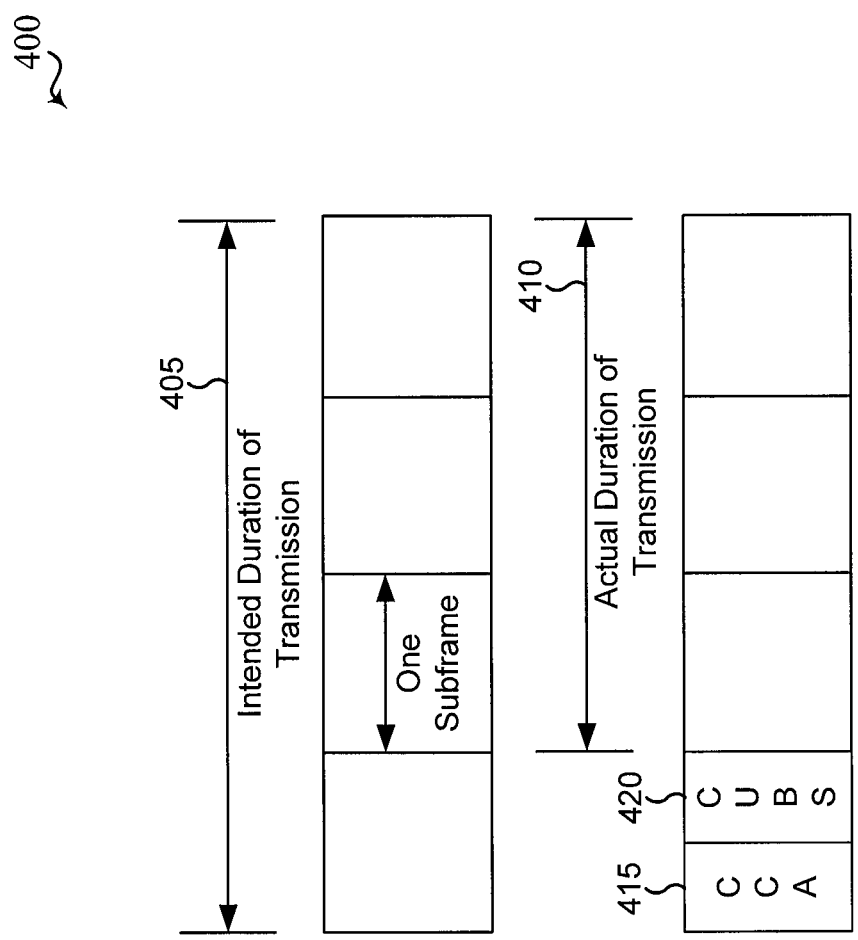
FIG. 4 is an illustration of an example of a CCA procedure performed by a transmitting apparatus when contending for access to a contention-based shared radio frequency spectrum band, in accordance with various aspects of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of four subframes and an actual duration 410 of three subframes.

As indicated above, FIG. 4 is provided as an example. Other examples are possible and may differ from what was described in connection with FIG. 4.

Figure 5:
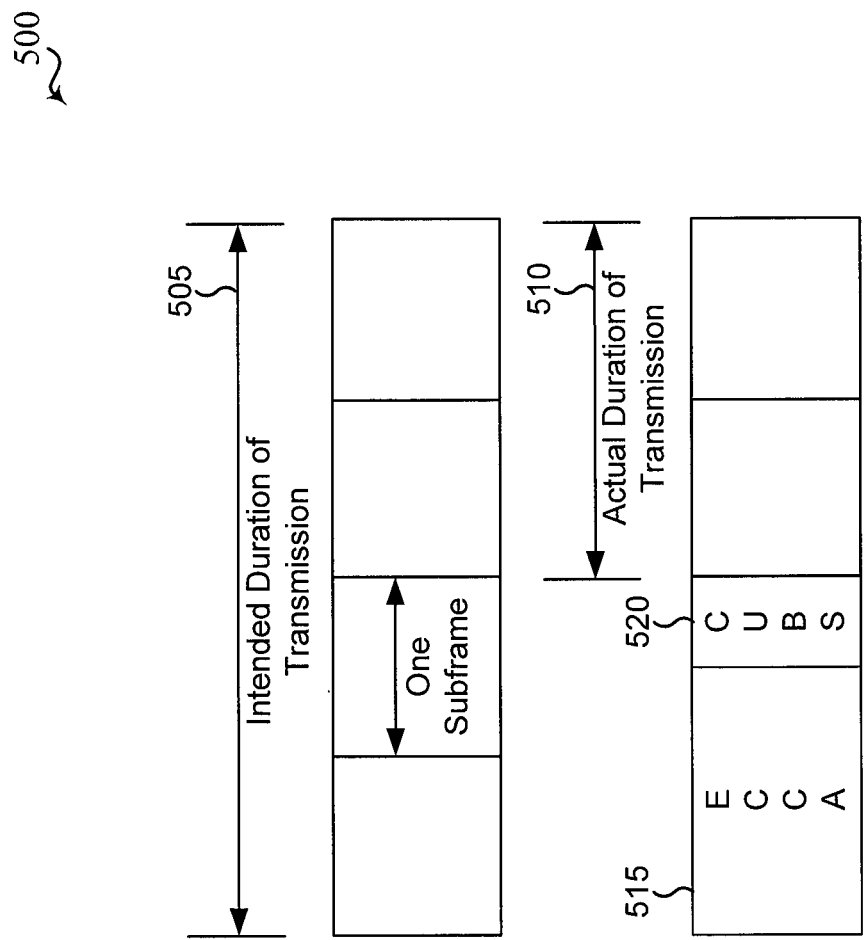
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of four subframes and an actual duration 510 of two subframes.

As indicated above, FIG. 5 is provided as an example. Other examples are possible and may differ from what was described in connection with FIG. 5.

Figure 6:
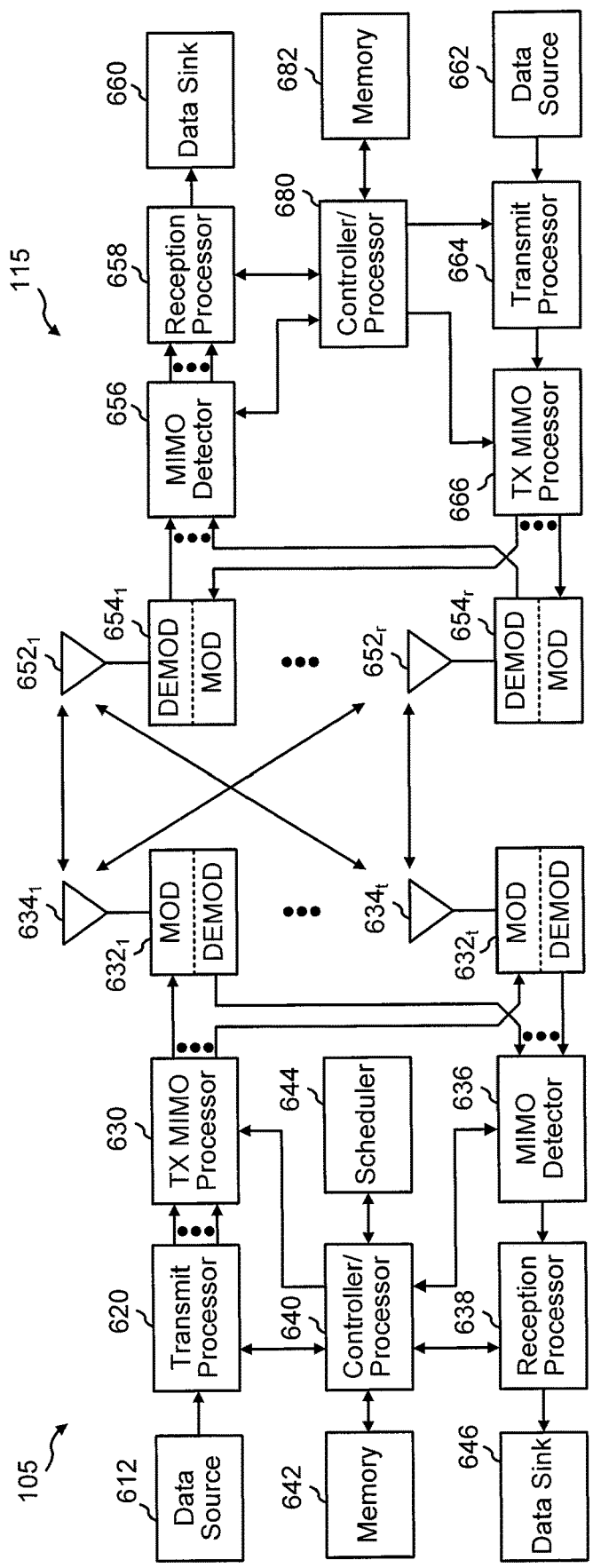
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and modules at the eNB 105 may perform or direct the execution of various processes for the techniques described herein. The controllers/processor 680 and/or other processors and modules at the UE 115 may also perform or direct the execution of the functional blocks illustrated in FIGS. 8, 10A, 10B, and 12, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

According to some aspects of the disclosure, a UE may blindly detect whether a subframe has a valid downlink transmission by testing for presence of CRS in symbol 0. For example, it is envisioned that a one shot LBT may be performed for a twenty-five microsecond duration within symbol 0. A one shot LBT is also referred to herein as a short LBT because it is shorter in duration than a full CCA. A short LBT also refers to any LBT shorter in duration than a full LBT. Accordingly, there are multiple types of LBT that may be performed by a UE. As described in greater detail below with reference to FIGS. 7 and 8, an eNB may indicate, to a UE, a type of LBT that the UE should perform, if any, based on eNB knowledge of an ongoing or recent downlink transmission on a frequency to be used by the UE for UL transmission. Thus, a UE may acquire a channel more quickly and/or save resources by avoiding a full CCA when the eNB knows that the channel is likely to be clear.

A transmit opportunity (TXOP) is defined herein is a sequence of one or more transmissions by a master device and optionally one or more slave devices initiated by the master device using the basic access mechanism. As explored in greater detail below, a paused TXOP may accommodate UL scheduling delays in LAA to ensure that the time not used by the eNB can be used by the UEs in a TXOP after the four millisecond delay. If a UE is unable to acquire a channel before the start time of the UL grant, then the UE may not be able to transit on all of the subframes allocated by the grant. Stated differently, the UE's TXOP may be truncated because of a limit on the end point of the TX OP, and failure to acquire the channel in time to begin uplink transmission at the starting point of the uplink transmission. However, as described in greater detail below with reference to FIGS. 9A and 9B, the present disclosure contemplates a semi-persistent grant having more than one start time, each with an end time providing a full length TXOP, so that the UE may start transmission at a later start time, if needed, and still transmit the entire TXOP.

Referring to FIG. 7, a method of wireless communication may be carried out by an eNB. The method of FIG. 7 represents a process carried by an eNB in order to set a LBT indication in an uplink grant to correspond to a condition associated with a potential downlink transmission. As explained below, the LBT indication may indicate no LBT, one shot LBT, UE decision, and/or full CCA, and the LBT indication may indicate more than one type of LBT and/or a series of types of LBT.

Beginning at block 700, the eNB may determine a type of a LBT indication to set in a UL grant to be transmitted on a first frequency (F1) in order to allocate, for a user equipment (UE), uplink resources on a second frequency (F2). It is envisioned that the indicator may be a field, flag, bit, or any other type of indicator. As explained in greater detail below, it is envisioned that the type of LBT may be no LBT, one shot LBT, UE decision, full CCA, and/or combinations thereof. Processing may proceed from block 700 to block 702.

At block 702, the eNB may set the LBT indication in the UL grant to correspond to a condition associated with a potential downlink transmission on F2. For example, it is envisioned that the condition may correspond to the potential downlink transmission occurring on F2 at a time T, where time T corresponds to the beginning of an UL transmission scheduled by the UL grant. Alternatively or additionally, it is envisioned that the condition may correspond to the potential downlink transmission occurring on F2 until time $T_p$, wherein $T_p$ is prior to T, and a time delta between T and $T_p$ is less than a threshold. Alternatively or additionally, it is envisioned that the condition may correspond to the potential downlink transmission occurring during a predetermined window, wherein the time window overlaps time T. Further, the potential downlink transmission may correspond to a transmission to the UE and/or to another UE from a serving eNB or a set of eNBs and/or remote radio heads (RRHs) in a CoMP set. Still further, the type of LBT may corresponds to a first type of LBT if the condition is met at time T and a second type of LBT if the condition is not met at time T. For example, it is envisioned that the first type of LBT indication may correspond to no LBT, one shot LBT, a short LBT, and/or UE decision, and that the second type of LBT indication may corresponds to a full CCA. Processing may proceed from block 702 to block 704.

At block 704, the eNB may transmit the UL grant to the UE for time T. Alternatively or additionally, the eNB may receive a UL transmission at one or more start times as described in greater detail below with reference to FIG. 9A. Alternatively, processing may end.

Referring to FIG. 8, a method of wireless communication may be carried out by a UE. The method of FIG. 8 represents a process carried by a UE in order to perform LBT in accordance with an LBT indication contained in an uplink grant. As described above, the LBT indication may indicate no LBT, one shot LBT, UE decision, and/or full CCA, and the LBT indication may indicate more than one type of LBT and/or a series of types of LBT.

Beginning at block 800, the UE may receive, on F1, a UL grant transmitted by an eNB. The UL grant may allocate, for the UE, uplink resources on F2. Processing may proceed from block 800 to block 802.

At block 802, the UE may determine a type of LBT indication in the UL grant. For example, the UE may determine that an LBT indicator is set to indicate no LBT or one shot LBT. Alternatively or additionally, the UE may determine that the LBT indicator is set to indicate UE decision. Alternatively or additionally, the UE may determine that the LBT indicator is set to indicate full CCA. Processing may proceed from block 802 to block 804.

At block 804, the UE may access F2 according to the determined type of LBT indication. For example, the UE may perform UL transmission on F2, in response to determining that the LBT indicator is set to indicate no LBT, without performing LBT on F2. Alternatively or additionally, the UE may perform one shot LBT on F2, in response to determining that the LBT indicator is set to indicate one shot LBT, prior to performing UL transmission on F2. Alternatively or additionally, the UE may perform, prior to performing UL transmission on F2 and in response to determining that the LBT indicator is set to indicate UE decision, one shot LBT on F2 followed by performing full CCA on F2 only if the one shot LBT on F2 proves unsuccessful. Alternatively or additionally, the UE may perform full CCA on F2, in response to determining that the LBT indicator is set to indicate full CCA, prior to performing UL transmission on F2. Processing may proceed from block 804 to block 806.

At block 806, the UE may perform UL transmission on F2 in accordance with the UL grant. As further explained below with reference to FIG. 9B, it is envisioned that the UL grant may be a semi-persistent UL grant. Accordingly, it is envisioned that, at block 806, the UE may perform UL transmission on F2 in accordance with a semi-persistent UL grant.

Figures 9A, 9B:
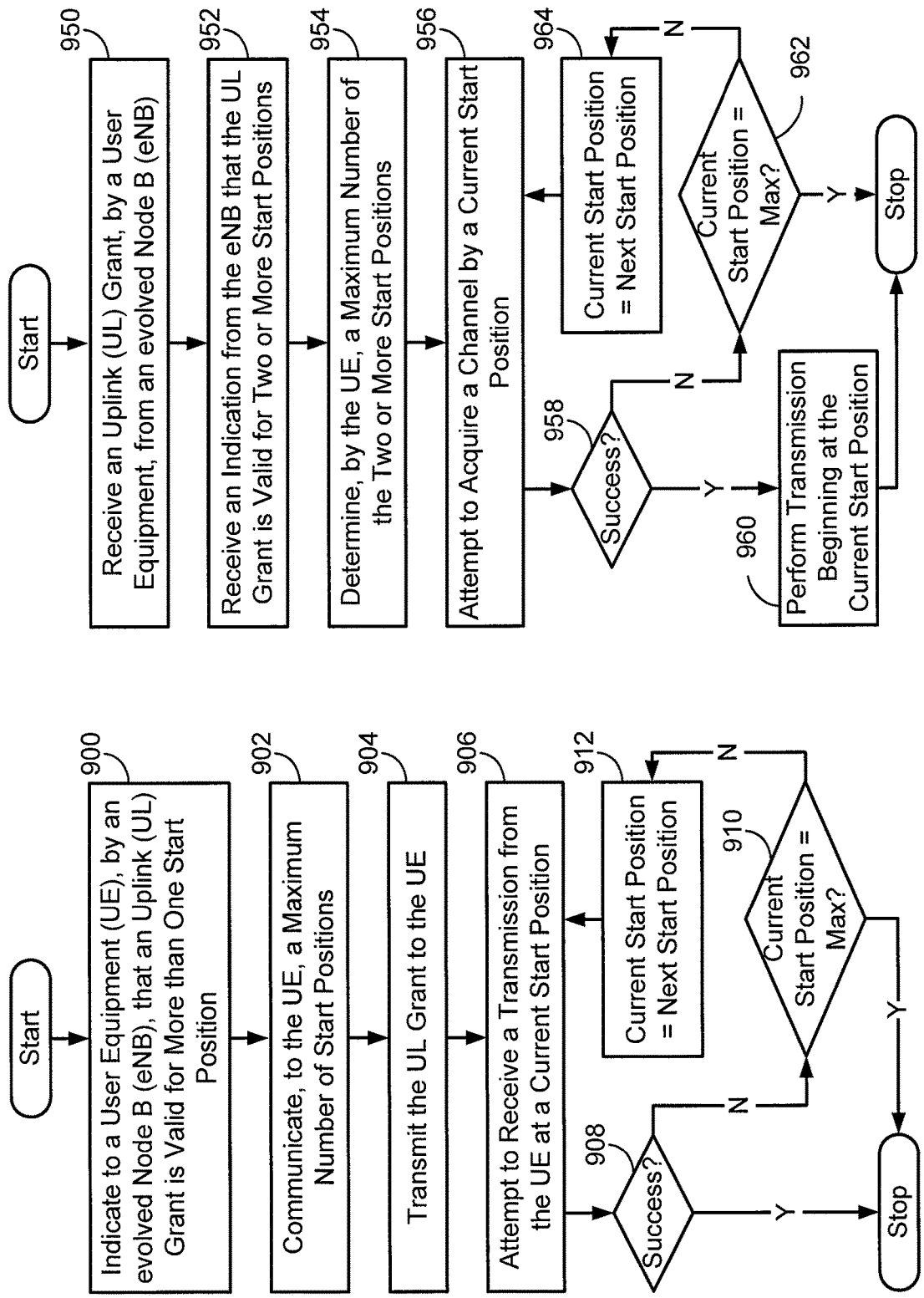
FIG. 9A is a block diagram illustrating example blocks executed to implement aspects of the disclosure.
FIG. 9B is a block diagram illustrating example blocks executed to implement aspects of the disclosure.

Referring to FIG. 9A, a method of wireless communication may be carried out by an eNB. The method of FIG. 9A represents a process carried out by an eNB in order to schedule semi-persistent UL grants to a UE. Such garnets may accommodate a paused transmission opportunity by being valid for more than one start time.

Beginning at block 900, the eNB may indicate to a UE that a UL grant is valid for two or more start positions, including at least a first start position and a second start position. It is envisioned that the eNB may schedule semi-persistent grants to only one UE at a time. Processing may proceed to block 902.

At block 902, the eNB may transmit the UL grant to the UE. Processing may proceed to block 904.

At block 904, the eNB may communicate, to the UE, a maximum number of start positions. For example, it is envisioned that the maximum number of start positions may be transmitted in an uplink grant. Alternatively or additionally, it is envisioned that the maximum number of start positions may be communicated in a common control message, in a system information message, and/or in an RRC message. Processing may proceed to block 906.

At block 906, the eNB may attempt to receive a UL transmission from the UE at a current start position, such as the first start position. For example, a current start position variable may be initialized to the first start position. Processing may proceed to block 908.

At block 908, the eNB may determine whether the attempt to receive the UL transmission at the first start position was successful. If the eNB determines that the attempt was successful, then processing may end. However, if the eNB determines that the attempt was not successful, then processing may proceed to block 910.

At block 910, the UE may determine whether receipt of the UL transmission from the UE has been attempted at the maximum number of start positions. For example, the eNB may compare the current start position variable to a maximum start position. If the eNB determines that the maximum number of start positions has been reached, then processing may end. Thus, the eNB may limit a number of the two or more start positions to the maximum number of start positions. However, if the eNB determines that the maximum number of start positions has not been reached, then processing may proceed to block 912.

At block 912, the eNB may proceed to a next start position. For example, the eNB may increment the current start position variable. Processing may then return to block 906, at which time the eNB may attempt, in response to determining that the attempt to receive the UL transmission at the first start position was not successful, to receive an UL transmission from the UE at the second start position. Processing may thus continue in this manner until the eNB determines, at block 908, that the UL transmission is successfully received, or until the eNB determines, at block 910, that the maximum number of start positions has been reached.

Referring to FIG. 9B, a method of wireless communication may be carried out by a UE. The method of FIG. 9B represents a process carried out by a UE in response to semi-persistent UL grants from an eNB. Such garnets may accommodate a paused transmission opportunity by being valid for more than one start time.

Beginning at block 950, the UE may receive a UL grant from an eNB. Processing may proceed to block 952.

At block 952, the UE may receiving an indication from the eNB that the UL grant is valid for two or more start positions, including a first start position and a second start position. Processing may proceed to block 954.

At block 954, the UE may determine a maximum number of the two or more start positions. For example, the UE may observe the maximum number of start positions communicated in the UL grant. Alternatively or additionally, the UE may observe the maximum number of start positions communicated in a RRC message. Processing may proceed to block 956.

At block 956, the UE may attempt to acquire a channel in time to perform UL transmission using the first start position. For example, the UE may initialize a current start position variable to the first start position, and attempt to acquire a channel in time to perform UL transmission using the current start position. Also, the UE may perform short LBT or full CCA, depending on an indicator in the grant, as detailed above with reference to FIG. 8. Processing may proceed to block 958.

At block 958, the UE may determine whether the attempt to acquire the channel in time to perform UL transmission using the first start position was successful. If the UE determines that the attempt was successful, then processing may proceed to block 960. However, if the UE determines that the attempt was not successful, the processing may proceed to block 962.

At block 960, the UE may perform transmission beginning at the current start position, and may transmit the entire TXOP. Thereafter, processing may end.

At block 962, the UE may determine whether acquisition of the channel has been attempted at the maximum number of start positions. For example, the UE may compare the current start position variable to a maximum start position. If the UE determines that the maximum number of start positions has been reached, then processing may end. Thus, the UE may limit a number of the two or more start positions at which to attempt to start transmission to the maximum number of start positions. However, if the eNB determines that the maximum number of start positions has not been reached, then processing may proceed to block 964.

At block 964, the UE may proceed to a next start position. For example, the eNB may increment the current start position variable. Processing may then return to block 956, at which time the UE may attempt, in response to determining that the attempt to acquire the channel in time to perform UL transmission using the previous (e.g., first) start position was not successful, to acquire the channel in time to perform UL transmission using the current (e.g., second) start position. Processing may thus continue in this manner until the UE determines, at block 958, that the channel was successfully acquired, or until the UE determines, at block 962, that the maximum number of start positions has been reached.

Figures 10A, 10B:
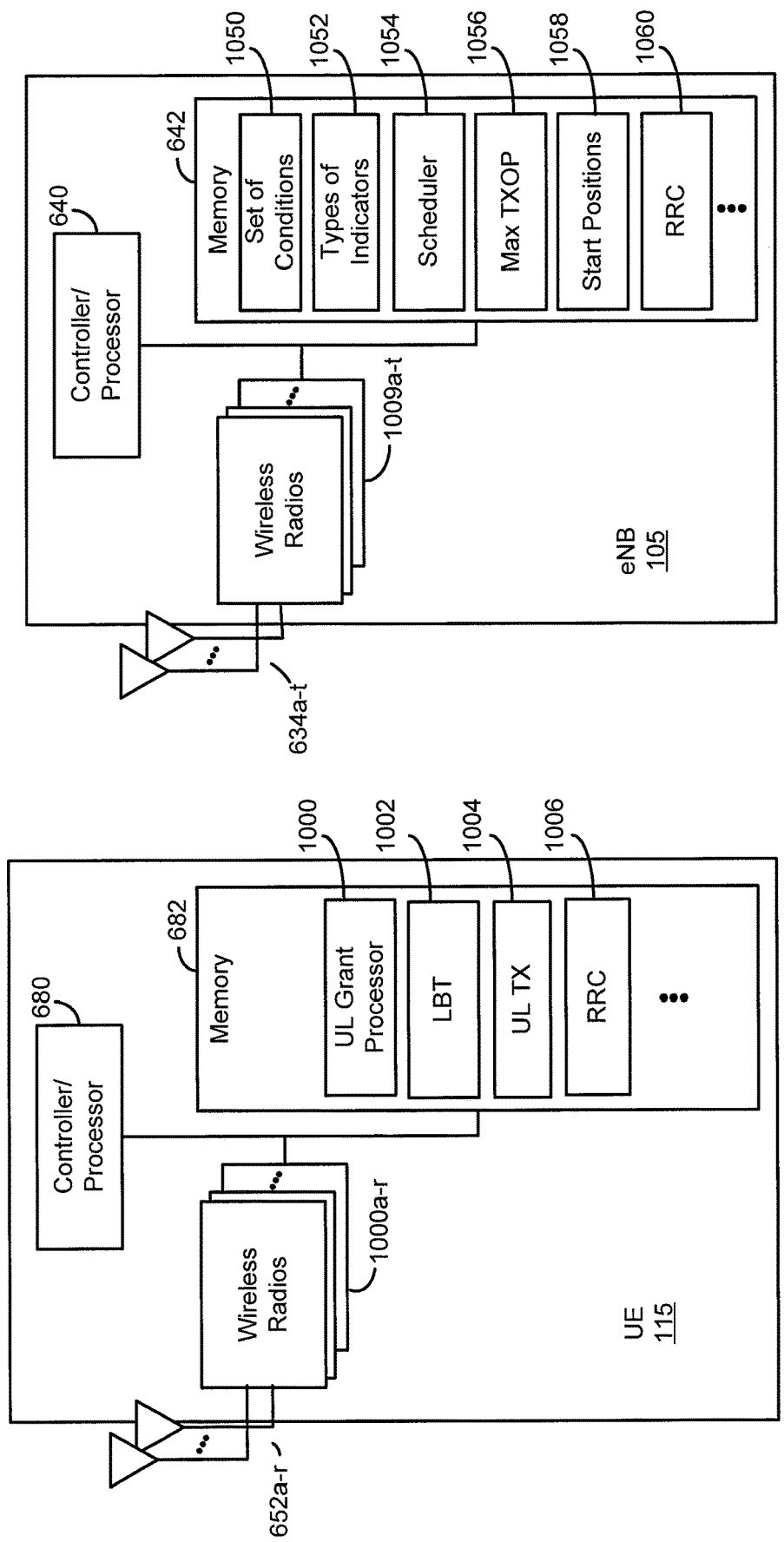
FIG. 10A is a block diagram illustrating a UE configured according to one aspect of the present disclosure.
FIG. 10B is a block diagram illustrating an eNB configured according to one aspect of the present disclosure.

Referring to FIG. 10A, a UE 115 may have a processor 680 and memory 682, wherein memory 682 may store instructions that configure processor 680 to carry out operations as described above with respect to FIGS. 8 and 9B. For example, memory 682 may store an uplink grant processor application 1000 that configures processor 680 to observe an indicator in an UL grant to determine a type of LBT to perform. The UL grant processor application 1000 may also configure the processor 680 to recognize an indication of a semi-persistent grant and a maximum number of start positions. An LBT application 1002 may be implemented to perform various types of LBT in response to the indicator observed in the grant. A UL transmission application 1004 may configure processor 680 to perform uplink transmission according to the grant using wireless radios 1000a-r and antennas 652a-r. RRC layer application 1006 may be responsive to RRC messages containing a maximum number of start positions as described above.

Referring to FIG. 10B, an eNB 105 may have processor 640 and memory 642 coupled to wireless radios 1009a-1 having antennas 634a-t, wherein memory 642 may store instructions that configure processor 640 to carry out operations as described above with respect to FIGS. 7 and 9A. For example, memory 64 may store a set of conditions 1050 for scheduler 1054 to determine one of two or more types of indicators 1052 to set in a UL grant. Scheduler 1054 may also allocate to a UE a semi-persistent grant and indicate to the UE that the grant is semi-persistent, as described above. Memory 1056 may store a max number of start positions 1056 and store information 1058 about attempted start positions. The scheduler may communicate the max number of start positions to the UE in a UL grant, or the RRC layer application 1060 may communicate this information in a RRC message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6, 7, 8, 9A, 9B, 10A, and 10B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by an evolved Node B (eNB), a type of a Listen Before Talk (LBT) from multiple types of LBT to set in an uplink (UL) grant scheduled for transmission on a first frequency (F1);
   setting, by the eNB based on the determined type, a LBT indication in the UL grant to correspond to a condition associated with a predetermined time window on a second frequency (F2) allocated for a downlink transmission; and
   transmitting, by the eNB, the UL grant on the F1 to a user equipment (UE), wherein the UL grant allocates uplink resources on the F2 for the UE beginning at time T that overlaps the predetermined time window.

2. The method of claim 1, wherein the condition corresponds to the downlink transmission occurring on the F2 until time $T_p$, wherein $T_p$ is prior to T, and a time delta between T and $T_p$ is less than a threshold.

3. The method of claim 1, wherein the type corresponds to a first type of LBT if the condition is met at time T and a second type of LBT if the condition is not met at time T.

4. The method of claim 3, wherein the first type of LBT corresponds to no LBT, a one shot LBT, or a short LBT, and the second type of LBT corresponds to a full clear channel assessment (CCA).

5. The method of claim 3, wherein the first type of LBT corresponds to a full clear channel assessment (CCA) and the second type of LBT corresponds to no LBT, a one shot LBT, or a short LBT.

6. The method of claim 5, wherein the second type of LBT corresponds to no LBT.

7. The method of claim 5, wherein the second type of LBT corresponds to one shot LBT.

8. The method of claim 3, wherein the downlink transmission corresponds to a transmission from a serving eNB or a set of eNBs or RRHs in a CoMP set.

9. The method of claim 1, wherein the condition corresponds to the downlink transmission occurring on the F2 at time T.

10. The method of claim 1, wherein the F1 and the F2 are a same frequency.

11. A method of wireless communication, comprising:
    receiving, by a user equipment (UE) on a first frequency (F1), an uplink (UL) grant transmitted by an evolved Node B (eNB), wherein the UL grant allocates, for the UE, uplink resources on a second frequency (F2);
    determining a type of listen before talk (LBT) based on an LBT indication in the UL grant;
    accessing the F2 by performing, based on the determined type of LBT, full clear channel assessment (CCA) on the F2 based on a one shot LBT on the F2 being unsuccessful; and
    performing UL transmission on the F2 based on the UL grant.

12. The method of claim 11, wherein determining the type of LBT includes determining that an LBT indicator is set to indicate no LBT, and wherein accessing the F2 includes performing UL transmission on the F2, in response to determining that the LBT indicator is set to indicate no LBT, without performing LBT on the F2.

13. The method of claim 11, wherein determining the type of LBT includes determining that an LBT indicator is set to indicate one shot LBT, and wherein accessing the F2 includes performing one shot LBT on the F2, in response to determining that the LBT indicator is set to indicate one shot LBT, prior to performing UL transmission on the F2.

14. The method of claim 11, wherein determining the type of LBT includes determining that an LBT indicator is set to indicate UE decision.

15. The method of claim 11, wherein determining the type of LBT includes determining that an LBT indicator is set to indicate the full CCA, and wherein accessing the F2 includes performing the full CCA on the F2, in response to determining that the LBT indicator is set to indicate full CCA, prior to performing UL transmission on the F2.

16. The method of claim 11, wherein the determined type of LBT is based on whether there are one or more transmissions on the F2 within a threshold of time prior to a first UL subframe indicated in the UL grant.

17. The method of claim 11, wherein the F1 and the F2 are a same frequency.

18. The method of claim 11, wherein the UL transmission on the F2 is performed after performing the full CCA on the F2.

19. The method of claim 11, further comprising:
    performing the one shot LBT on the F2 based on the determined type of LBT; and
    determining whether the one shot LBT on the F2 is successful.

20. The method of claim 11, further comprising determining whether the LBT indication is set to indicate UE decision, and wherein the one shot LBT on the F2 is performed based on determining that the LBT indication is set to indicate UE decision.

21. A wireless communication apparatus, comprising:
at least one processor configured to:
  receive, by a user equipment (UE) on a first frequency (F1), an uplink (UL) grant transmitted by an evolved Node B (eNB), wherein the UL grant allocates, for the UE, uplink resources on a second frequency (F2);
  determine a type of listen before talk (LBT) based on an LBT indication in the UL grant;
  access the F2 according to the determined type of LBT, wherein to access the F2, the at least one processor is further configured to perform full clear channel assessment (CCA) on the F2 based on a one shot LBT on the F2 being unsuccessful; and
  perform UL transmission on the F2 based on the UL grant; and
at least one memory coupled to the at least one processor.

22. The wireless communication apparatus of claim 21, wherein the at least one processor is configured to determine the type of LBT by determining that an LBT indicator is set to indicate no LBT, and wherein the at least one processor is configured to access the F2 by performing UL transmission on the F2, in response to the determining that the LBT indicator is set to indicate no LBT, without performing LBT on the F2.

23. The wireless communication apparatus of claim 21, wherein the at least one processor is configured to determine the type of LBT by determining that an LBT indicator is set to indicate one shot LBT, and wherein the at least one processor is configured to access the F2 by performing one shot LBT on the F2, in response to the determining that the LBT indicator is set to indicate one shot LBT, prior to performing UL transmission on the F2.

24. The wireless communication apparatus of claim 21, the at least one processor is configured to determine the type of LBT by determining that an LBT indicator is set to indicate UE decision.

25. The wireless communication apparatus of claim 21, wherein the at least one processor is configured to determine the type of LBT by determining that an LBT indicator is set to indicate the full CCA, and wherein the at least one processor is configured to access the F2 by performing the full CCA on the F2, in response to the determining that the LBT indicator is set to indicate full CCA, prior to performing UL transmission on the F2.

26. The wireless communication apparatus of claim 21, wherein the determined type of LBT is based on whether there are one or more transmissions on the F2 within a threshold of time prior to a first UL subframe indicated in the UL grant.

27. The wireless communication apparatus of claim 21, wherein the F1 and the F2 are a same frequency.

28. A communication apparatus, comprising:
at least one processor configured to:
  determine, by an evolved Node B (eNB), a type of a Listen Before Talk (LBT) of multiple types of LBT to set in an uplink (UL) grant scheduled for transmission on a first frequency (F1);
  set, by the eNB based on the determined type, a LBT indication in the UL grant to correspond to a condition associated with a predetermined time window on a second frequency (F2) allocated for a downlink transmission; and
  transmit, by the eNB, the UL grant on the F1 to a user equipment (UE), wherein the UL grant allocates uplink resources on the F2 for the UE beginning at time T that overlaps the predetermined time window; and
at least one memory coupled to the at least one processor.

29. The communication apparatus of claim 28, wherein the LBT indication and the condition indicate that the UE is to performing full clear channel assessment (CCA) on the F2 based on a one shot LBT on the F2 being unsuccessful.

* * * * *